Jan. 25, 1944.  E. M. SHOOK ET AL  2,340,275
METHOD FOR SEISMIC SURVEYING
Filed March 20, 1940   8 Sheets-Sheet 5

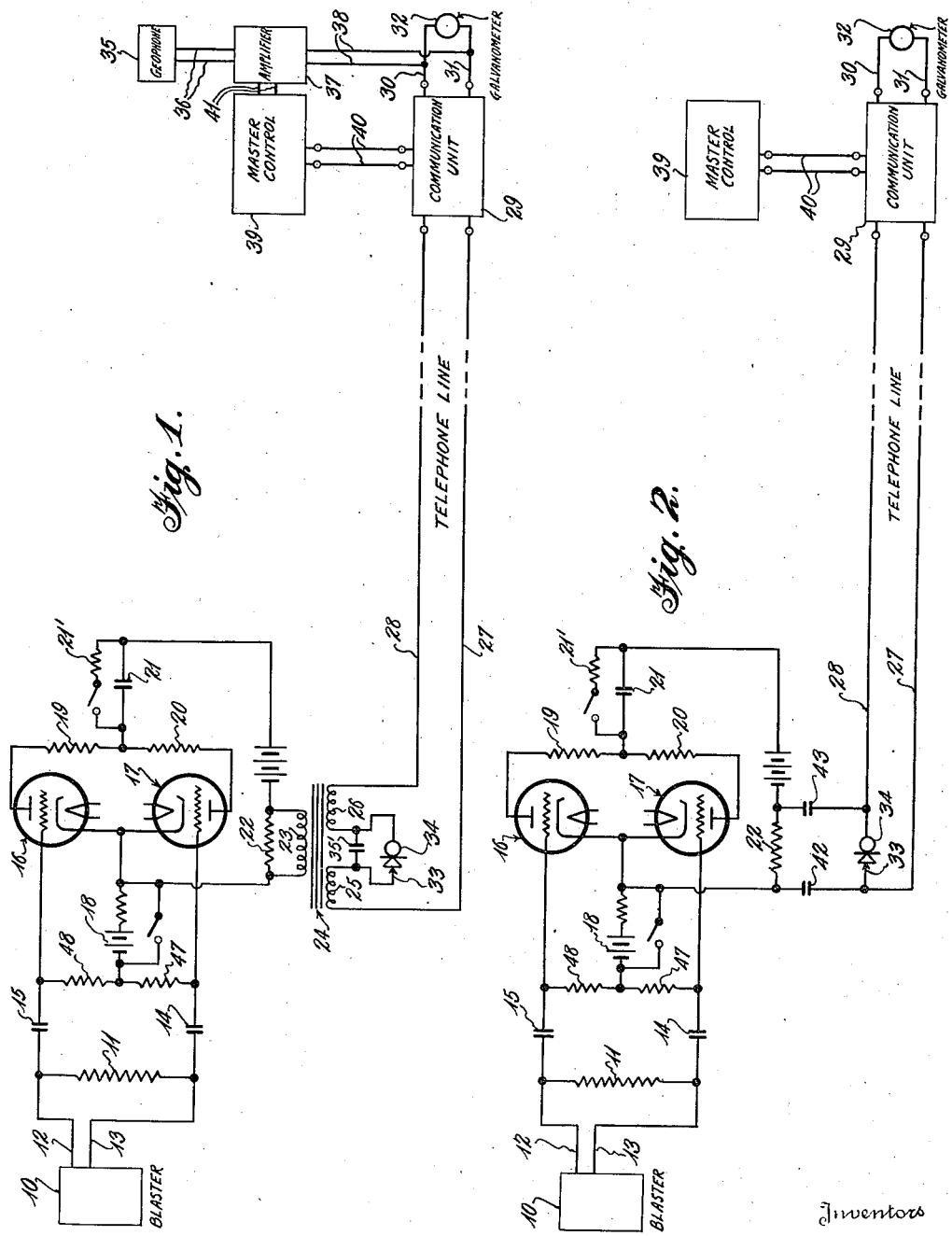

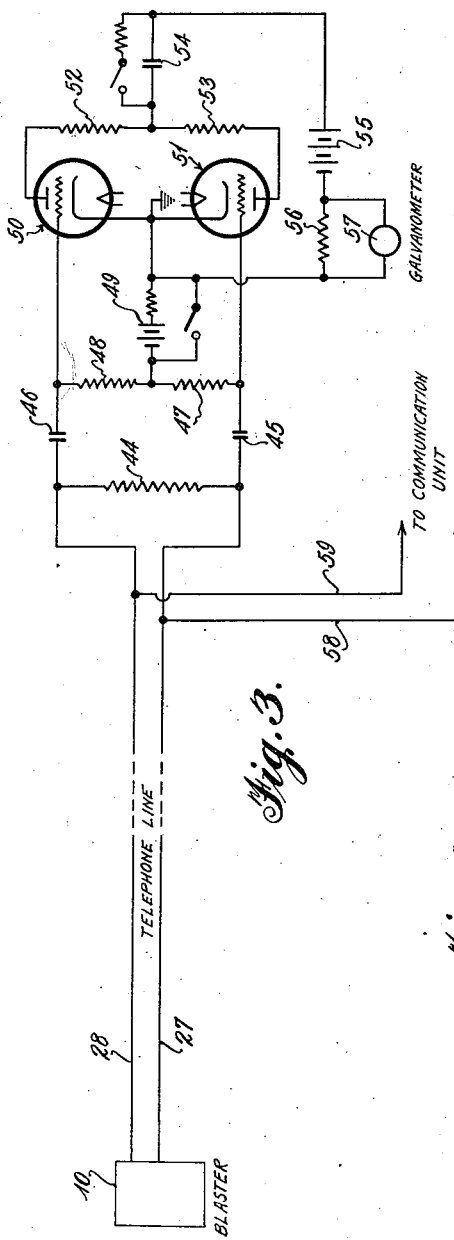
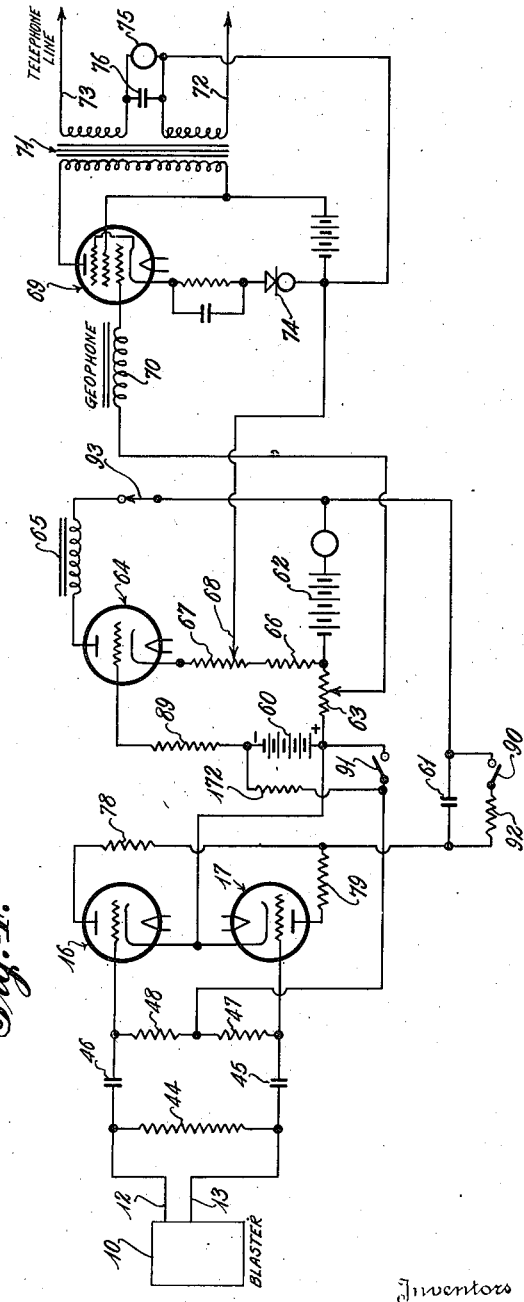

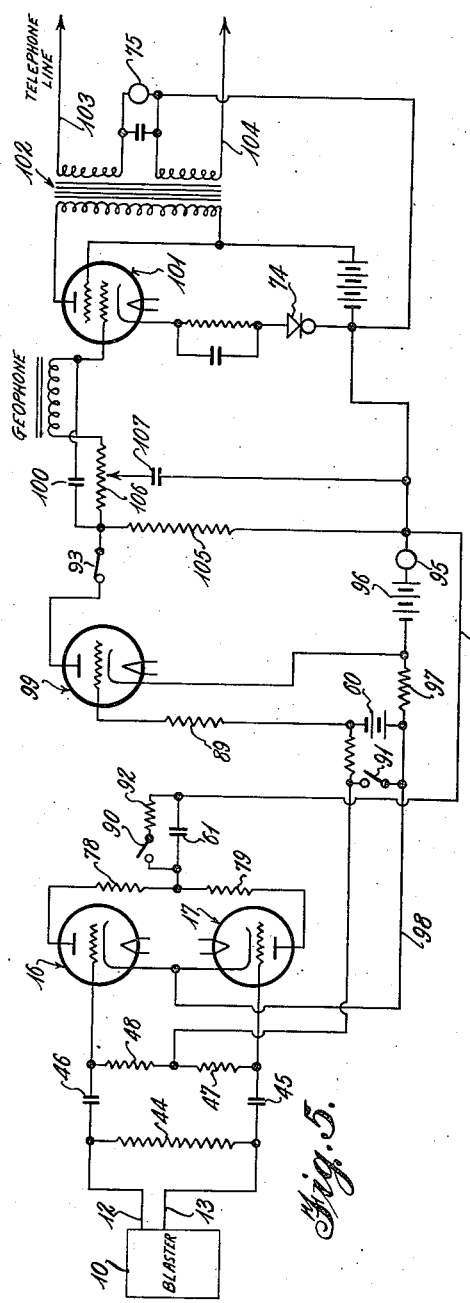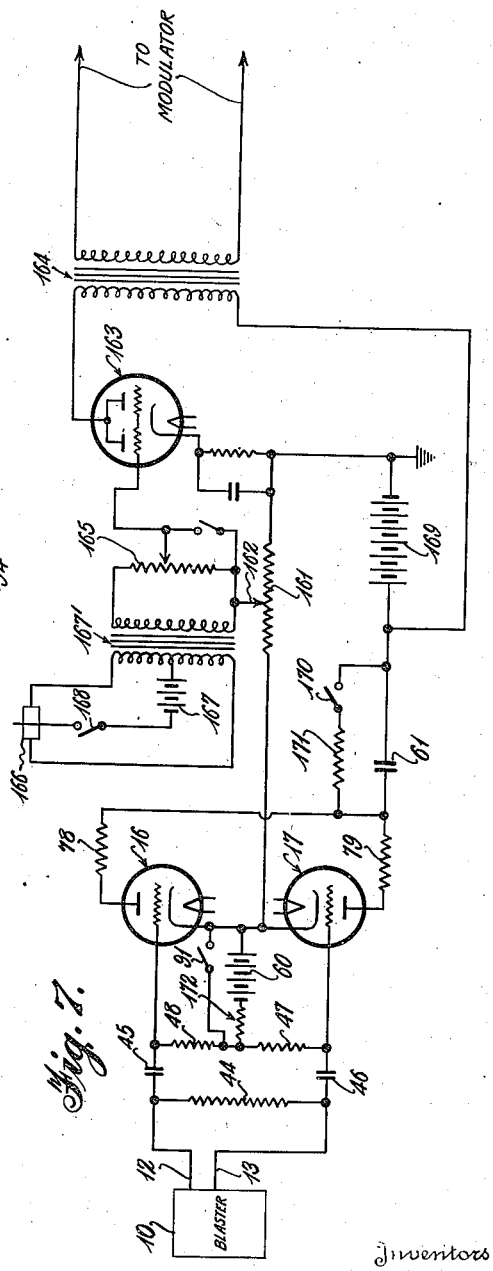

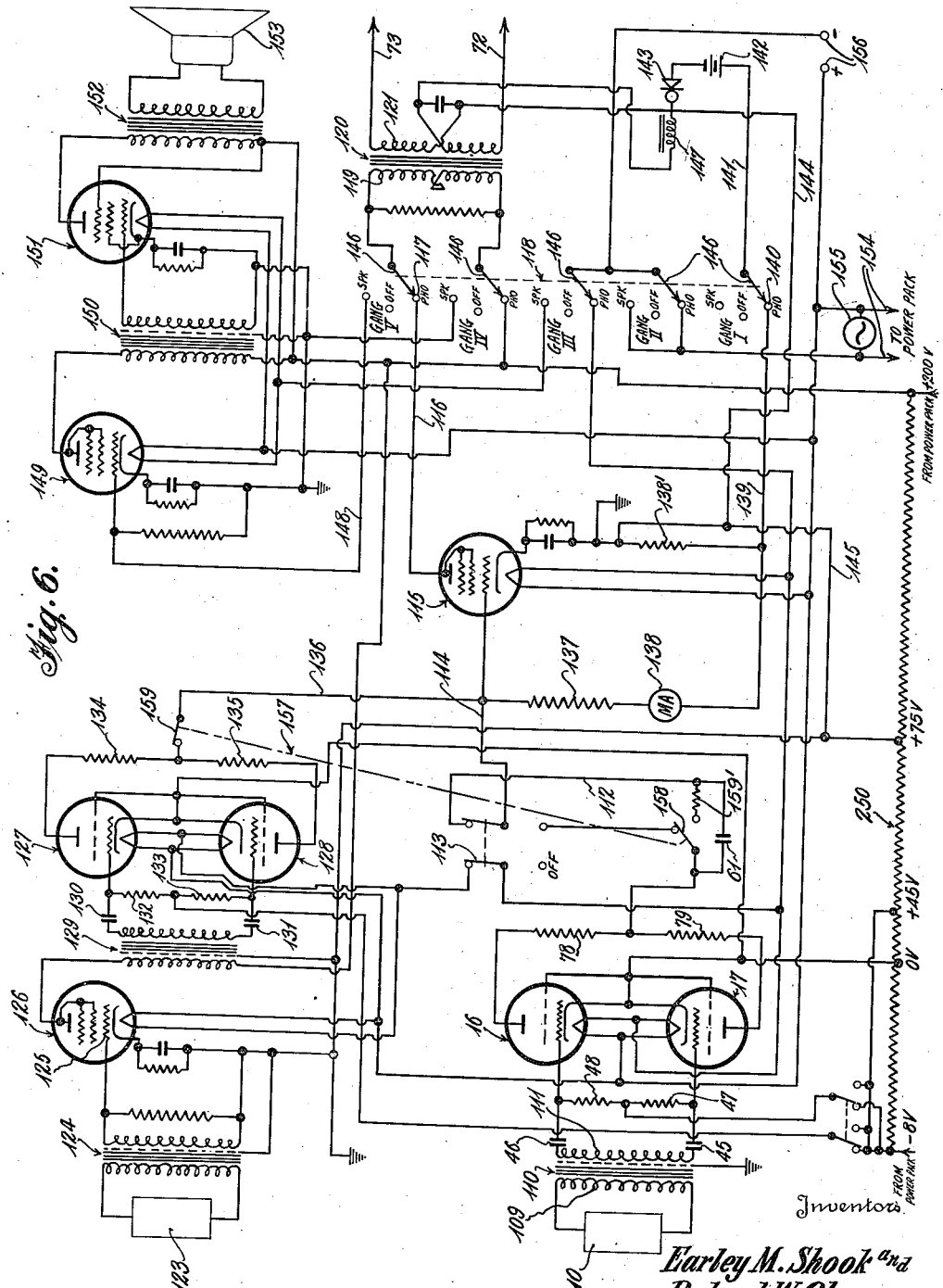

Inventors
Earley M. Shook 3rd
Robert W. Olson
By
Attorney

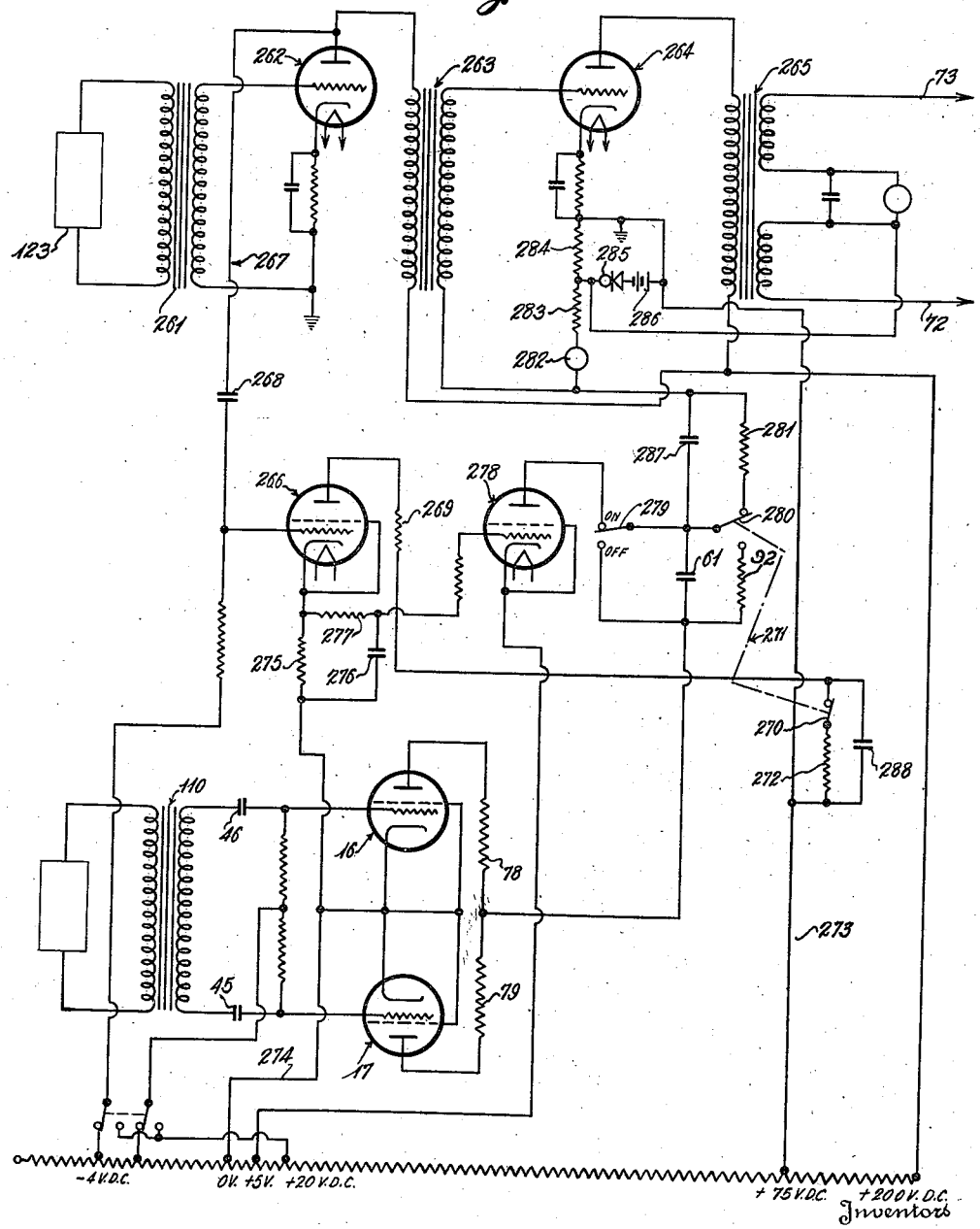

Jan. 25, 1944.   E. M. SHOOK ET AL   2,340,275
METHOD FOR SEISMIC SURVEYING
Filed March 20, 1940   8 Sheets-Sheet 7
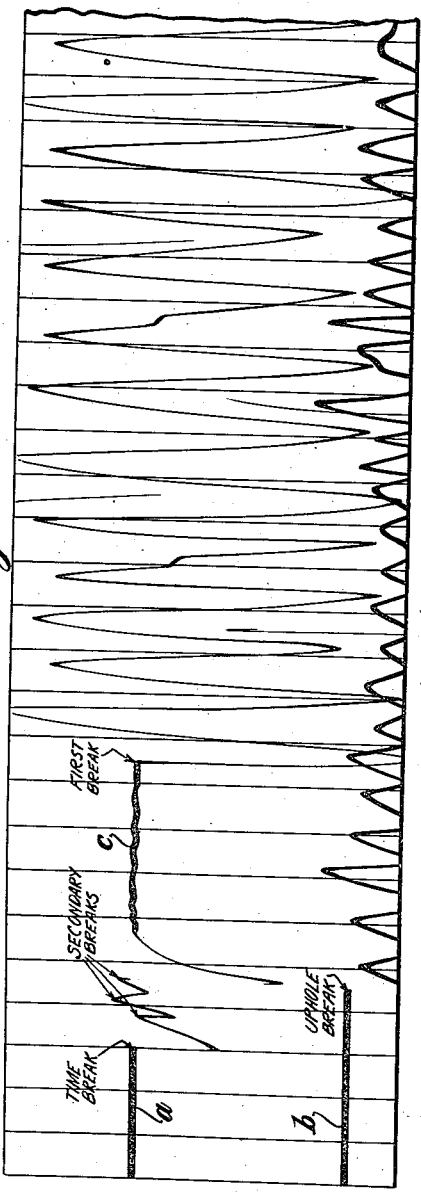
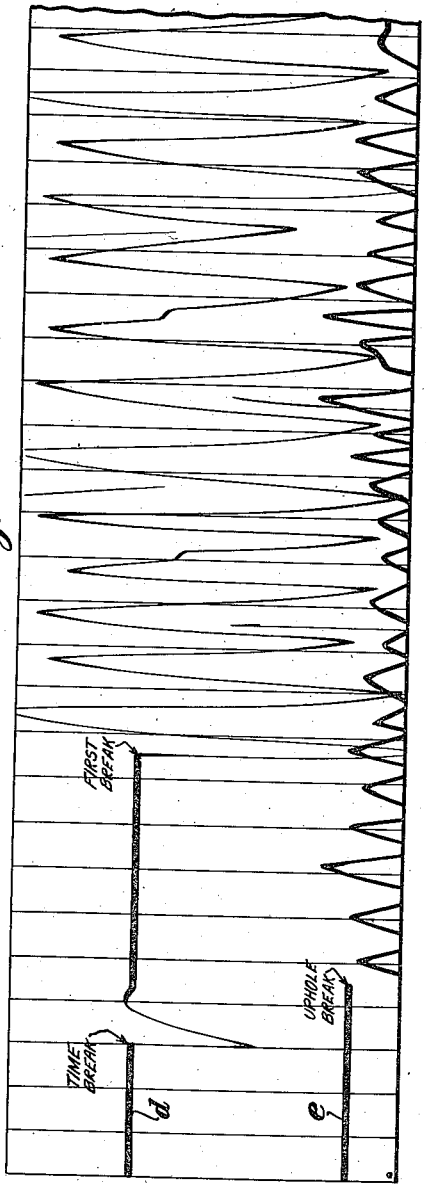
Inventors
*Earley M. Shook* and
*Robert W. Olson*
By
Attorney

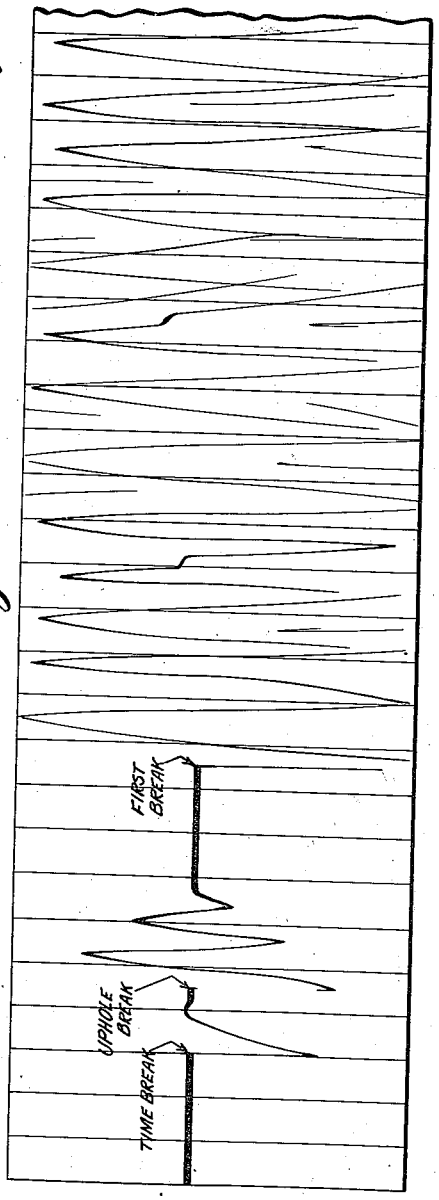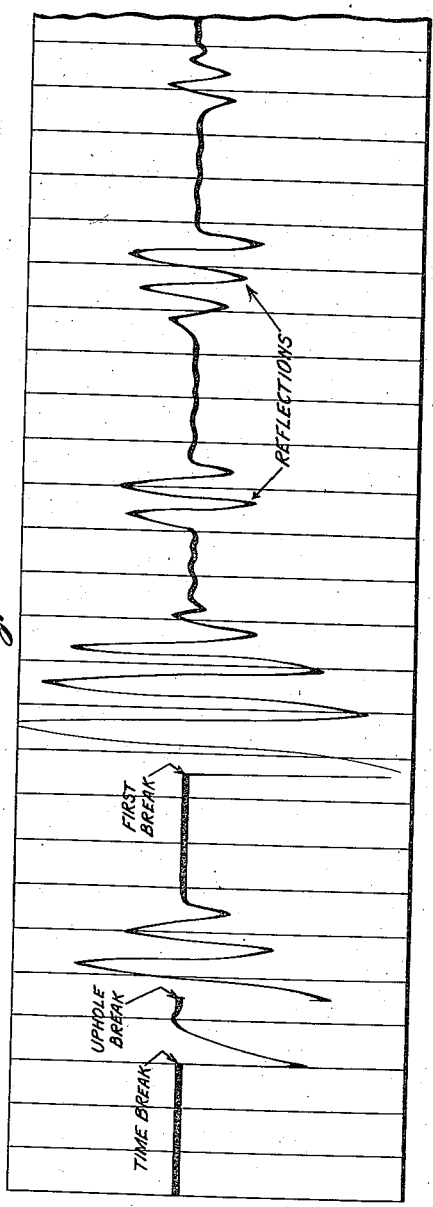

Patented Jan. 25, 1944

2,340,275

UNITED STATES PATENT OFFICE 2,340,275

METHOD FOR SEISMIC SURVEYING

Earley M. Shook and Robert W. Olson, Dallas, Tex., assignors, by mesne assignments, to Socony-Vacuum Oil Company, Incorporated, New York, N. Y., a corporation of New York Application March 20, 1940, Serial No. 324,930

3 Claims. (Cl. 177—352)

This invention relates to a method for recording seismic waves and more particularly to a method of recording the instant of detonation of a charge of explosives which creates seismic waves in the earth's surface and of automatically disconnecting a detector or geophone that is used to detect vertically traveling waves from the explosive charge which creates the seismic waves in the earth's surface. Additionally, this invention contemplates a method for producing the above enumerated results without disrupting the process of recording seismic waves in the manner which has been practiced heretofore in the art of reflection seismic survey.

In the art of seismic prospecting, it has heretofore been necessary to provide means which will respond to an electrical impulse for producing an indication of the instant of detonation of an explosive charge. This indication when recorded on a seismogram is known in the art as a time break. To produce such a time break with some forms of apparatus known it is necessary that reliance must be placed upon an operator for properly connecting the circuits which detonate the charge of explosive. With this particular type of apparatus if the detonator for the explosive charge has been improperly connected, the rupture of the detonating circuit will produce a transient voltage that is of a polarity that will not be transmitted through the apparatus to the recorder. This would result in an erroneous time break that would come from subsequent impulses which have been generated by making and breaking the detonating circuit after the charge of explosives has been detonated. By the instant invention it is possible to eliminate these difficulties by providing suitable circuits whereby, regardless of the polarity of the transient voltage generated in the detonating circuit, the rupturing of the detonating circuit will produce an indication on the seismogram that is being recorded which will be accurate and a true indication of the instant of detonation of the explosive charge. This feature of the present invention is claimed in divisional application Serial Number 478,943, filed March 12, 1943, and entitled "Apparatus for transmitting seismic signals."

In addition to the time break circuit described above, a number of other circuits by means of which the instant of detonation can be registered on a seismogram are known. Some of these do not discriminate as to the polarity of the electrical impulse which indicates the instant of detonation. Although these circuits do not have polarity discrimination they have not proven entirely satisfactory due to the fact that no means have been provided for eliminating spurious voltages which when recorded on a seismogram would appear as time breaks. These objectionable features have been overcome by the instant invention.

When conducting a seismic survey of a particular area it is always necessary that consideration be taken of the weathered unconsolidated strata of the earth's surface for in this strata the velocity of wave travel is considerably less than the velocity of wave travel in the denser media. If one fails to take cognizance of this fact, errors are introduced in both the correlation and the subsequent profiles computed from the data for this particular area. Therefore, this invention further contemplates a method for recording data from which the velocity of vertically traveling waves in the unconsolidated outermost strata of the earth's surface can be determined.

The instant invention further provides a method whereby one geophone that has been placed adjacent the mouth of the shot hole, known in the art as the uphole geophone, can be disconnected from the circuit of a geophone forming a part of the standard spread or rendered inoperative after it has detected the first direct traveling impulses. In other words, there can be recorded on a single trace of a multiple-trace seismogram the time break, the first break or breaks arriving at the uphole geophone, the first break of a geophone in the conventional spread and subsequent waves comprising refracted and reflected waves which are detected by this geophone. A conventional spread such as that referred to in this application is of the type used in reflection or refraction seismic surveying, that is, the geophones are collaterally spaced from the shot point.

From the above it is obvious that the difficulties encountered by those practicing the methods of the prior art are obviated in that all the data that is necessary from a single spread when shot in one direction can be recorded on a single seismogram. This record will include a time break indicative of the instant of detonation of the explosive charge which creates the seismic waves in the earth's surface, the time consumed by the vertically traveling waves from the explosive charge to the surface and the time required for these waves which have been created by the explosive charge to travel downwardly to the interfaces of the subsurface strata and be reflected back to the geophones which have been collaterally spaced from the shot point.

Reverting to the phase of the instant invention which provides for accurately recording the instant of detonation of the explosive charge which creates the seismic waves in the earth's surface, the error due to the human element involved is completely eliminated in that regardless of the manner in which the detonating circuit is made up, the transient voltage resulting from the current dying out of the detonating circuit will always initiate the operation of means which will mark the exact instant of the detonation of the explosive charge.

Another feature of the instant invention resides in the provision of novel means whereby the indication of the instant of detonation, the time break impulse, as well as the first impulse from the uphole geophone can be communicated from the shot point to the recording apparatus by means of telephone or radio. The local terrain of a particular area in many instances makes the use of telephone lines or conductors very impractical, particularly when the survey is being conducted on bodies of water, such as lakes, or in swamps. In consequence, the use of a single transmission channel for voice signals as well as seismic data is highly desirable. This phase of the present invention is claimed in divisional application Serial Number 478,944, filed March 12, 1943, and entitled "Apparatus for recording seismic waves."

Therefore, a primary object of this invention resides in the provision of a method and apparatus for accurately producing on a seismogram an indication of the exact instant of detonation of an explosive charge that is used to create seismic waves in the earth's surface.

Another object of this invention resides in the provision of a method and apparatus for recording on a single trace waves which correspond to vertically traveling seismic waves, from the explosive charge to the surface, and waves that correspond to the seismic waves which have traveled downwardly to the interfaces of the substrata and have been reflected to the surface.

This invention also contemplates means for automatically disconnecting or rendering inoperative the uphole geophone after the waves which travel vertically from the explosive charge have been detected.

It is still a further object of this invention to provide means for automatically rendering inoperative the uphole geophone after the vertically traveling waves have been detected and prior to the reception of waves which have traveled directly to the spread geophones, and those which have been reflected from the interfaces of subsurface strata.

Still another object of this invention resides in the provision of means for communicating the time break and the first impulse from the uphole geophone to the recording equipment by means of a single telephone or radio communication channel.

Still another object of this invention resides in the provision of means whereby a plurality of data can be recorded on a single trace of a seismogram in such a manner that any one datum will not interfere with the other data.

Other objects and advantages of this invention will be apparent from the following detailed description when considered in connection with the drawings in which:

Figure 1 is a diagrammatic illustration of a circuit by means of which the time break impulse regardless of polarity can be transmitted to the recording unit by means of telephonic communication;

Figure 2 is a diagrammatic illustration of an electrical circuit which differs from that shown in Figure 1 in that the system is connected by capacitances to the telephonic communication system;

Figure 3 is a diagrammatic illustration of a circuit by means of which the time break can be communicated to the recording unit showing the push-push time break circuit located at the recording end of the telephone line;

Figure 4 is a modification of the circuit shown in Figure 3;

Figure 5 is still another modification of this circuit;

Figure 6 is a composite wiring diagram of electrical circuits by means of which voice communication can be had between the shot firer and the recording instrument operator, means for communicating the time break impulse to the recorder and means for communicating the first impulse from the uphole geophone to the recorder;

Figure 7 is a modification of the circuit diagram shown in Figure 1 differing therefrom in that the time break impulse is communicated to the recorder by means of radio;

Figure 8:
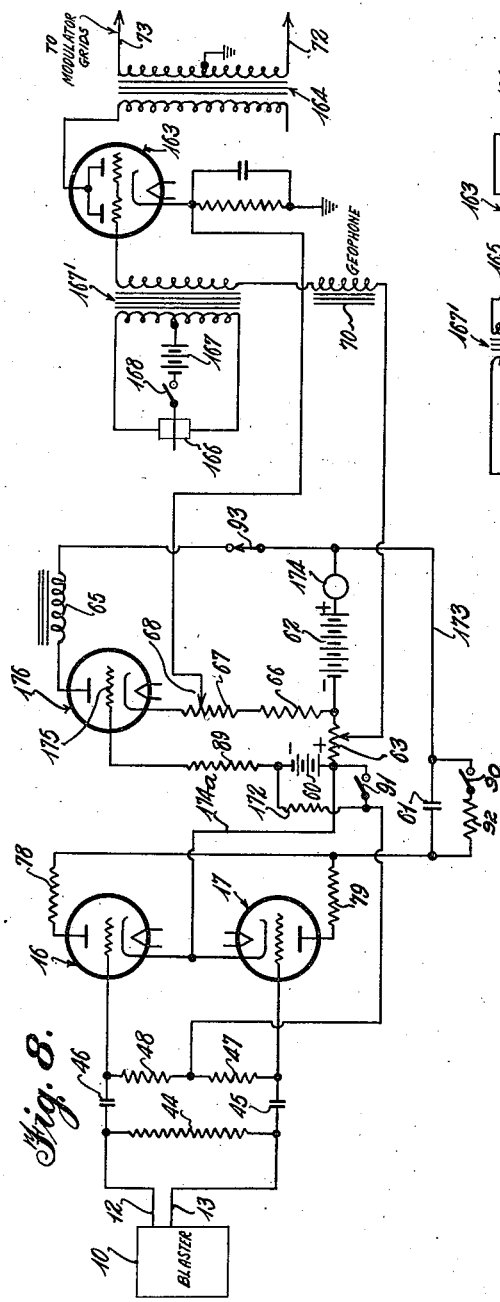
Figure 9:
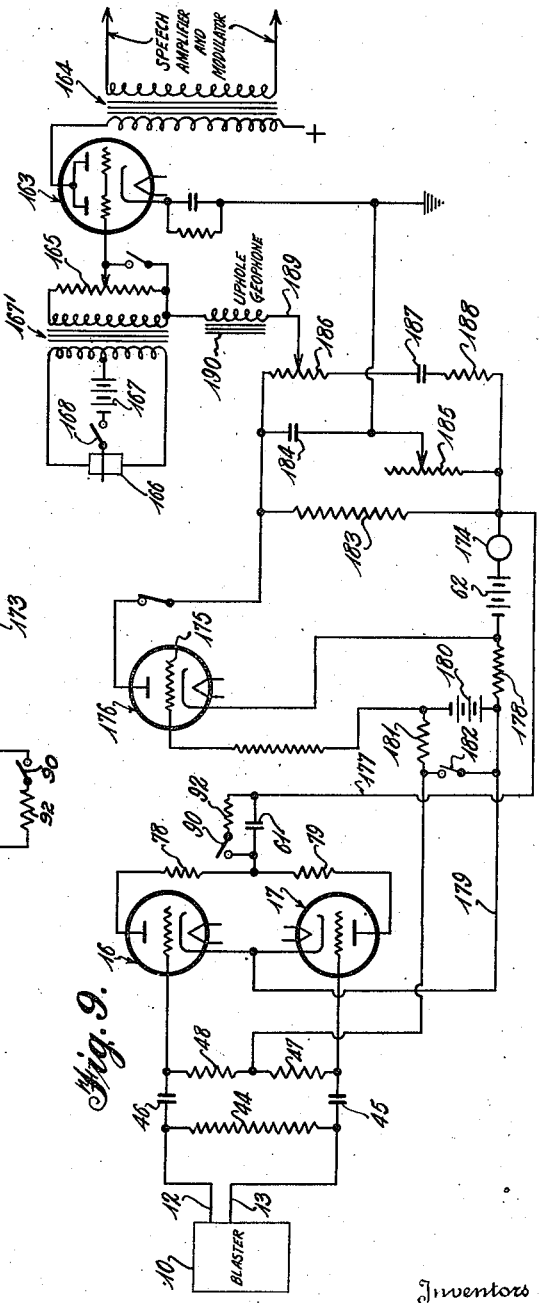

Figure 8 differs from Figure 7 in that circuits are provided whereby the first impulses received by the uphole geophone are also communicated to the recorder by means of radio;

Figure 9 is a modification of the invention illustrated in Figure 8. By means of the circuits illustrated in this diagram the same data can be communicated by radio to the recorder;

Figure 10 is a wiring diagram of an electrical circuit of another modification of this invention by means of which the time break and the uphole geophone impulses can be communicated to the recording instrument;

Figure 11 is illustrative of a seismogram which has been recorded that shows the time break, secondary breaks such as those produced by making and breaking of the detonating circuit after detonation occurs and first breaks such as those received by any one of the geophones of the spread on one trace and the uphole geophone impulse on the other trace;

Figure 12 illustrates a typical record of the type recorded when using the invention forming the subject matter of this application. The impulse corresponding to the uphole geophone signal has been recorded on a separate trace;

Figure 13 is an illustration of a single trace of a typical record which has been recorded when using the invention forming the subject matter of this application showing the time break, the uphole break and the first break on the same trace of the seismogram in such a manner that any one of the three will not obscure the other; and Figure 14 illustrates one trace of a seismogram on which the time break, the uphole break, the first break, and subsequent reflections have been recorded.

Referring to the drawings in detail, in particular, Figure 1, there is shown a circuit diagram of one phase of this invention which deals with the communication of a signal, indicative of the instant of detonation of an explosive charge to create seismic waves in the earth's surface, to a recorder. By means of this electrical circuit a signal indicative of the true instant of detonation will be transmitted to the recording apparatus regardless of the polarity of the signal voltage generated when the blaster circuit is ruptured by the detonation of the explosive. The current dying out of the blaster circuit, illustrated by block diagram at 10, produces a transient voltage that will be communicated to the resistance 11 by means of the conductors 12 and 13. Current flowing through the resistance 11 will produce an instantaneous voltage drop across this resistance which serves as a charging potential for condensers 14 and 15. Condensers 14 and 15 are in the grid circuit of the gas triode tubes 16 and 17. These tubes are of the type commonly known by the trade name "thyratron." Their characteristics are such that when a negative potential of sufficient magnitude has been placed on their grids, by means of the battery 18, no plate current will flow. When this negative bias has been removed or in part equalized, the grid will lose control in the tubes and plate current will flow until it has been interrupted by some means. Therefore, a charging potential placed on condensers 14 and 15, depending upon its polarity, will cause one of the tubes 16 or 17 to fire, resulting in the flow of plate current through resistance 19 or 20 to charge condenser 21. The plate current in charging condenser 21 will produce a voltage drop across resistor 22. This voltage drop across the resistor 22 being in the form of a pulse can be impressed upon the primary winding 23 of a transformer 24 to produce a corresponding signal in the secondary windings 25 and 26. By means of conductors 27 and 28 this transformed voltage pulse is communicated to the communication unit 29 and through the communication unit by means of conductors 30 and 31 to the recording galvanometer 32, where it is recorded on a trace of the seismogram.

Tubes 16 and 17 are provided with a common grid bias potential 18. By connecting these two tubes in the manner shown in Figure 1, one of the tubes will fire on the first impulse received from the blaster circuit regardless of its polarity. After one of the tubes has fired to produce a current in the plate circuit, the condenser 21 is charged, and once this condenser has become charged, plate current can no longer flow in the circuit. Therefore, the second tube will be prevented from firing on subsequent impulses which are of opposite polarity to the first impulse received. The condenser 21 therefore in effect acts as a trap to stop the flow of plate current from the gas triodes 16 and 17. Additionally, after one of the gas triodes 16 or 17 has fired, no further signals will be communicated to the recorder from the blasting circuit. This condition will exist until condenser 21 has been discharged through the resistance 21'. This will eliminate spurious voltages generated by the detonating circuit and blaster itself from being communicated to the recorder and recorded on the seismogram trace.

In order to hold duplex communication with the operator at the recording apparatus, the secondary winding 26 of the transformer 24 is divided and the two sections of the winding have connected in series with them, but between them, a microphone 33 and a receiver 34. Condenser 35' is connected across both the microphone and the receiver for the purpose of by-passing the time break impulse and preventing a loud click in the receiver. This condenser is not large enough to reduce voice currents appreciably.

The remainder of the electric seismograph is shown in block-diagram. The geophone 35 may be a geophone of a conventional spread. This geophone is connected by means of conductors 36 to the input of an amplifier 37. The output of the amplifier 37 is connected by means of conductors 38 to the recording galvanometer 32.

In some cases it is desirable to use the time break impulse received from the blaster circuit to initiate the operation of a master control which controls the gain in amplification derived from one or more amplifiers. When this is the case, the communication unit 29 is connected to the master control 39 by means of conductors 40. The master control then is appropriately connected to the amplifier through leads 41. Although for purposes of explanation a single geophone 35 is shown in this figure, it is apparent to those skilled in the art that a plurality of geophones are used with their respective amplifiers when doing reflection seismic survey work.

In Figure 2 there is shown a slight modification of the circuit illustrated in Figure 1. The circuit of Figure 2 differs from that of Figure 1 in that the plate circuit of the gas triode tubes 16 and 17 is capacitively connected by means of condensers 42 and 43 to the conductors 27 and 28 instead of by means of the transformer 24 shown in Figure 1. The microphone 33 and receiver 34 in the circuit of Figure 2 are connected in series and across the leads 27 and 28 on the opposite side of condensers 42 and 43 from the resistance 22. This circuit functions in the same manner described in connection with Figure 1.

Still another modification of this invention is shown in Figure 3. In this instance the time break circuit is located not at the shot point but at the recording location. The impulse generated by the rupturing of the blasting circuit is communicated by means of the telephone lines 27 and 28 to the resistance 44. This impulse regardless of its polarity produces an IR drop across this resistance which acts as a charging potential for the condensers 45 and 46. The current flowing in the circuit while charging condensers 45 and 46 produces an IR drop across the resistances 47 and 48. Depending upon the polarity of the impulse received from the blaster, the IR drop across one of the resistors 47 and 48 will add to the grid bias as supplied by battery 49 on one of the gas triodes 50 or 51 to become sufficiently less negative that one of the tubes will fire to produce a flow of plate current through its respective resistance 52 or 53 to charge the condenser 54. The battery 55 is the usual plate potential supply. Current flowing in the plate circuit while condenser 54 is becoming charged produces an IR drop across resistance 56 which can be recorded directly on a recording galvanometer 57 as the instant of rupture of the detonating circuit. Duplex communication can be had between the shot firer and the recording instrument operator by means of the conventional communication equipment through the conductors 58, 59, 27, and 28.

A further embodiment of this invention is illustrated by the circuit diagram in Figure 4. This circuit is intended to transmit a signal that is indicative of the instant of detonation of the explosive charge, the first impulse received by the geophone that is placed adjacent the shot point, and speech by a single telephone channel and at the same time prevent the three pulsations from interfering with one another or from causing interference on the record. The time break will be transmitted without polarity discrimination.

In this embodiment of the invention, the transient voltage produced in the detonating circuit of the blaster 10, in the manner described in connection with Figures 1, 2 and 3, causes one of the gas triodes 16 or 17 to fire. This is caused by the flow of current through resistors 47 and 48 which will produce an IR drop across them. The IR drop across one of these resistances will add to the bias potential supplied to one of the tubes 16 or 17 by means of the battery 60 in such a way as to cause the grid to lose control and the tube to become conductive. Current flowing in the plate circuit will be in the form of a surge that will charge condenser 61. This impulse is transmitted through the battery 62, the resistance 63, back to the cathodes of the gas triodes 16 and 17. The flow of this current through the resistance 63 will cause the grid potential on the grid of gas triode tube 64 to become sufficiently less negative that the gas triode 64 will become conductive and a current will flow in its plate circuit. Inductance 65 is placed in the plate circuit so that there will be a delay in the build-up time for the plate current. The flow of current in the plate circuit of gas triode 64 produces an IR drop across the resistance 66 and resistance 67 which will cut off the plate current from the amplifier tube or translating device 69. The period of time between the firing of gas triode 64 and cutting off the plate current from tube 69 is made sufficiently long that the uphole geophone will have ample time to detect the first impulse of waves traveling vertically upward from the explosive charge. This period of time is controlled by inductance 65 plus resistances 66 and 67 and by varying the position of the tap 68 on the resistance 67. The plate current having been cut off from tube 69 after the impulse received from uphole geophone 70 has been amplified, transformed by the transformer 71 and communicated to the recording instrument by means of the conductors 72 and 73, no further signals can be communicated to the recording instrument and the same trace on which the time break and uphole break were recorded can be used to record signals from one of the geophones in the conventional spread. Additionally, since the tube 69 isolates the blaster the time break and uphole geophone circuits from the telephone line and recording instrument, noises such as those produced by the microphone 74 which is connected in the cathode circuit of tube 69 will not produce disturbances on the trace of the seismogram. In order to receive voice signals from the operator of the recording instrument over the telephone line formed by conductors 72 and 73, the secondary winding of the transformer 71 is divided and a telephone receiver 75 is placed in series but between these two windings. The usual phone condenser 76 is connected across the telephone receiver.

The resistances 78 and 79 are placed in the plate circuits of the gas triodes 16 and 17 to compensate for any difference in the triodes when testing.

This circuit may be tested by closing the switches 90 and 91. A test time break can then be produced and transmitted by the switch 91. The circuit can be reset by momentarily closing the switch 90 permitting the condenser 61 to be discharged through the resistance 92 and momentarily opening switch 93 to break the plate circuit of the gas triode 64.

In Figure 5 there is shown a modification of the circuit illustrated in Figure 4. The same results namely, the transmission of the time break, the first impulse from the uphole geophone, and telephone communication, can be transmitted over a single telephone channel. This circuit, like the one shown in Figure 4, will transmit the time break without polarity discrimination. The first part of this circuit from the blaster through the two gas triodes 16 and 17 is identical with the circuit described and shown in Figure 4. The current from one of the gas triodes 16 or 17 will flow through the conductor 94, the milliammeter 95, the battery 96, the resistance 97, the conductor 98, back to the cathode of the gas triode 16 or 17. The flow of this plate current through the resistance 97 produces an IR drop which will cause the bias potential supplied to the grid of gas triode 99 to become less negative to cause triode 99 to fire. The first impulse of plate current flowing from gas triode 99 through condenser 100 will be impressed on the grid of an amplifier tube 101. The amplified impulse will be transformed by the transformer 102 and conducted by means of the telephone lines 103 and 104 to the recording galvanometer where it is recorded on one of the traces of a seismogram. Resistance 105 is a coupling resistance. The flow of plate current from gas triode 99 will also be through a portion of the resistance 106 to charge the condenser 107. The time required for condenser 107 to become fully charged is controlled by the position of the contactor on resistance 106. The fully charged potential of condenser 107 serves as a grid bias for amplifier tube 101. When this condenser reaches full charge, the bias placed on the amplifier tube 101 is sufficient to entirely block it to prevent any further signals from the uphole geophone or from the blaster circuit from being conducted to the recording instrument. The period of time required for condenser 107 to reach its full charge is controlled in such a manner that an impulse delivered to the uphole geophone by vertically traveling seismic waves can be amplified and transmitted to the recorder before amplifier tube 101 is biased to cutoff. By blocking amplifier tube 101, the same trace on which the time break and uphole break has been recorded can be used to record signals generated by one of the geophones in the conventional spread. All three signals will be recorded on a single trace without any one interfering with the other.

The microphone 74 and telephone receiver 75 are connected in this circuit in the same manner as described in connection with the circuit diagram of Figure 4.

A further modification of this invention is shown in detail by the circuit diagram of Figure 6.

By means of this circuit the signal indicative of the instant of detonation of the explosive charge which produces seismic waves, the first impulse generated by the uphole geophone, and signals generated by a geophone of the conventional spread can be recorded on a single trace without one interfering with either of the others. This circuit like the others described above does not have a polarity discrimination characteristic, that is, the first impulse received from the blaster circuit or from the uphole geophone whether positive or negative will be transmitted to the recording apparatus and recorded on a trace of the seismogram as true indications of the exact instants at which they occur.

A signal from the detonating circuit of the blaster 10 is impressed across the primary winding 109 of the transformer 110. The resultant voltage in the secondary winding 111 of this transformer is connected through condensers 46 and 45 to the grid circuits of gas triodes 16 and 17. This voltage will cause an IR drop to be built up across the resistances 47 and 48 due to current flowing through them. One of these IR drops depending upon the polarity of the impulse received from the detonating circuit of the blaster will be positive relative to the negative grid potential existing on the tubes 16 or 17. This positive potential causes the grid potential on one of the tubes to become less negative permitting the tube to fire causing a flow of current in its plate circuit to charge condenser 61. The flow of the current in the plate circuit of this gas triode will be in the form of a pulse for when the condenser 61 becomes charged no further plate current can flow and as a result subsequent signals from the blasting circuit will not fire the other gas triode. The pulse of current flowing to charge condenser 61 is transmitted by means of conductor 112 to the double pole throw switch 113, through the switch when it is thrown in an up position, and the conductor 114, through resistor 137, meter 138, resistor 138' to ground and plus 75 volts, through D. C. supply to zero volts and back to the cathode of gas triodes 16 and 17. This pulse of current causes an IR drop across resistor 137, meter 138 and resistor 138'. This IR drop is also in the grid-cathode circuit of a repeater tube or translating device 115 and it is repeated and amplified by tube 115 and transmitted by means of its plate circuit 116 through switch 118 to the primary 119 of transformer 120. The voltage induced in the secondary winding 121 of this transformer is impressed on the telephone channel that is formed by the conductors 72 and 73. The signal is thus transmitted to the recording galvanometer where it is recorded on one of the traces of the seismogram as a true indication of the exact instant at which detonation of the explosive charge occurred.

After the explosive charge has been detonated seismic waves will travel vertically from the point where the explosion occurred to the surface of the earth where they are detected by a geophone 123 that has been located adjacent the mouth of the shot hole. Since only the first impulse detected by the geophone is used by the interpreter of the seismograms no more of the signals generated by the geophone are transmitted to the recorder and recorded. Therefore, means are provided as shown in the circuit diagram of Figure 6 for suppressing or completely eliminating all signals from the uphole geophone after the first impulse has been communicated to the recording instrument.

The first impulse detected by the geophone 123 is communicated by means of the transformer 124 to the grid 125 of an amplifier tube 126. The amplifier tube 126 amplifies this impulse and communicates the amplified signal to the grid circuits of gas triodes 127 and 128 by means of the transformer 129, condensers 130 and 131 and the resistances 132 and 133. This signal impulse will in the manner described in connection with gas triodes 16 and 17 cause one of the tubes 127 or 128 to fire and produce a flow of current through resistances 134 or 135 and plate circuit 136 which is common to both of the gas triodes. This plate circuit includes the conductor 136, the resistor 137, the milliammeter 138, resistor 138' to ground and plus 75 volts, through plate supply to zero volts and cathodes of gas triodes of tubes 127 and 128. The flow of plate current in this plate circuit through resistance 137 will produce a voltage drop which serves as a bias potential for the grid of amplifier tube 115. At the instant the plate current begins to flow the impulse of the current building up in this circuit is transmitted through the amplifier tube, conductor 116 and contact 117 of switch 118, transformer 120 and the telephone line formed by conductors 72 and 73 to the recording galvanometer where it is recorded on a trace of the seismogram. Since the plate current flowing through the resistor 137 builds up to its maximum immediately, the IR drop across this resistance will bias the amplifier tube 115 to cutoff thereby blocking any further signals which would tend to pass through the amplifier tube. This in effect isolates the recording instrument from the blaster, uphole geophone, and microphone circuits so that they will not produce disturbances on the trace on which the uphole impulse and time break impulse have been recorded that would tend to obscure subsequent signals that are being recorded from a geophone in the conventional spread. Because of the characteristics of gas triodes plate current will continue to flow through resistance 137 and milliammeter 138 until the circuit has been broken. This can be accomplished by operating switch 157. This operation opens contact 159 which breaks the plate circuit for the gas triodes 127 and 128 and also closes contact 158 and thus discharges condenser 61 through resistance 159'. Switch 157 can be of the push button type in which the contacts 158 and 159 are resiliently biased to the position shown in the drawings.

When the contact arms 146 of gang switch 118 are in the position shown in the drawings, voice communication can be carried on between the recording instrument operator and the shot firer by means of the telephone receiver 147 and the microphone 143. However, when the contacts 146 of gang switch 118 are thrown to their uppermost position the microphone 143 is cut out of the circuit and an amplifier with a loud speaker is thrown into the circuit in such a manner that the recording instrument operator can call the shot firer. This amplifier is a conventional amplifier comprising amplifier tube 149, transformer 150, amplifier tube 151, transformer 152, and the loud speaker 153. When the contacts 146 of the switch 118 are thrown to the up position the power supplied to the time break circuit, uphole geophone circuit and amplifier tube 115 is cut off leaving only the conventional amplifier and speaker energized.

The device is shown as operating in conjunction with a vibrator power pack. The low voltage D. C. input is applied to terminals to 156. This low voltage is used to run the power pack and the filaments. The high voltage from the power pack supplies the entire plate and bias voltage, the voltage being taken from appropriate taps of a voltage divider 250.

When the uphole geophone is not used the uphole geophone circuit can be disconnected from the remainder of the circuit by throwing the double pole double throw switch 113 to its down position. This operation disconnects the filaments from all of the tubes in the uphole geophone circuit and eliminates condenser 61 from the plate circuit of gas triodes 16 and 17. This allows the time break gas triodes 16 and 17 to bias the repeating tube 115 to cut off. This feature is provided so that the shot firer will have to reset the gas triodes 16 and 17 in order to talk to the recording operator.

Another embodiment of this invention is shown by the circuit diagram in Figure 7. This embodiment differs from those described above in that the time break is transmitted by radio rather than by telephone lines to the recording instrument without polarity discrimination. The signal from the detonating circuit of blaster 10 is connected in the manner described above to the grid circuits of gas triodes 16 and 17 and in the same manner causes one of the tubes to fire and charge condenser 61. During the time the condenser 61 is being charged current will flow through resistance 161 in returning to the cathodes of either tube 16 or 17 and will produce an IR drop in this resistance. Any portion of this IR drop can be taken off of the resistance 161 by means of the contactor 162 and impressed on the grid of preamplifier tube 163. The output of this amplifier tube is connected by means of the transformer 164 to the modulator of a conventional radio transmitter, the circuit of which is not shown. The amplitude of the input signal from the time break gas triode circuit to the preamplifier tube 163 can be adjusted by means of the variable tap 162 on resistor 161.

In order that the shot firer can communicate by voice with the recording instrument operator a microphone 166 is connected as shown to the primary winding of the transformer 167'; the secondary winding of this transformer is connected through the variable resistance 165 of the grid circuit of the preamplifier tube 163. In this instance it is preferable to use a microphone of the type whose voltage potential 167 is normally disconnected from it. For this purpose a spring biased switch 168 is provided which will cause the voltage circuit to the microphone to remain open except when manually held closed.

Battery 169 provides the plate potential for the preamplifier tube 163 as well as the plate potential for the gas triodes 16 and 17. When it is desired to reset the circuit it is necessary that the switch 170 be momentarily closed so that the condenser will discharge through the resistor 171. Switch 91 is provided so that the negative potential can be removed from the grids of tubes 16 and 17 and causes plate current to flow for test purposes. The resistance 172 is placed in series with battery 60 to prevent shorting the battery when the switch 91 is closed.

In Figure 8 there is shown still another embodiment of this invention which is a modification of the circuits shown in Figures 7 and 6. This circuit includes the necessary apparatus for disconnecting the uphole geophone after the first impulse generated by it has been recorded on a trace of the seismogram. The transmission of the time break and the uphole geophone impulse in this instance is by means of radio.

In the manner described in connection with Figures 6 and 7 the impulse generated in the detonating circuit of the blaster 10 is communicated to the grid circuits of the gas triodes 16 and 17 to initiate the flow of plate current from one of these triodes 16 or 17, dependent upon the polarity of the impulse received in the grid circuit. In a similar manner the plate current will flow from one of these triodes to charge the condenser 61. The remainder of the plate circuit is the conductor 173, milliammeter 174, the battery 62, potentiometer 63, and the conductor 174a which leads to the cathodes of the gas triodes 16 and 17. The flow of current through variable resistance 63 while condenser 61 is being charged produces an IR drop which when algebraically added to the potential of the grid bias battery 60 will cause the negative potential on grid 175 of gas triode 176 to become sufficiently less negative that tube 176 will fire. The current from the plate of this tube will build up slowly in the plate circuit due to the inductance 65 and the resistances 66 and 67. This period of time is made variable by making the resistance 67 a potentiometer. By moving the contactor 68 of the potentiometer 67 a period of time amply long for the uphole geophone 70 to transmit to the recording galvanometer the first impulse detected by it is effected before preamplifier tube 163 has been rendered inoperative to transmit signals. The IR drop produced across the resistance 66 and that portion of potentiometer 67 between its lower end and the variable contact 68 will build up to a value which will bias the preamplifier tube 163 to cut off and thereby block it so that signals other than the first impulse from the uphole geophone and time break signals can not be communicated to the recording instrument. The preamplifier tube 163 is connected in the manner described in Figure 7 through a transformer 164 to a modulator circuit of a conventional radio transmitter. The microphone by means of which the shot firer can communicate with the operator of the recording instrument is also connected in the circuit in a similar manner described and shown in Figure 7.

Still another embodiment of this invention is disclosed in Figure 9. The arrangement of the gas triodes 16 and 17 relative to the blaster circuit is the same as that described above. Plate current flows to charge condenser 61 located in the plate circuit formed by conductor 177, milliammeter 174, battery 62, resistance 178, conductor 179, and the cathodes of tubes 16 and 17. This current will produce an IR drop across the resistance 178 which when added algebraically to the potential of battery 180 will cause the grid bias potential on grid 175 of gas triode tube 176 to become sufficiently less negative that tube 176 will fire to produce a flow of plate current. Resistance 181 is provided in the grid circuit of tubes 16 and 17 to prevent shorting battery 180 when switch 182 is closed for test purposes. Resistance 183 is a conventional coupling resistance. The plate circuit of gas triode 176 is divided into three branches comprising in one branch the coupling resistance 183, in a second branch a condenser 184 and variable resistance 185 connected in series and in the third branch a variable resistance 186, condenser 187 and resistance 188 connected in series. At the instant the gas triode 176 fires and plate current begins to flow, condenser 187 and resistances 186 and 188 having a small time constant, condenser 187 will become charged quickly, after which current will no longer flow in the third branch of the plate circuit. This impulse of current which charges condenser 187 produces an IR drop across the resistance 186 and a portion of this IR drop is tapped off and conducted by conductor 189 through an uphole geophone 190 to the grid circuit of a preamplifier tube 163. The signal from the plate circuit of tube 163 is communicated to the modulator circuit of a conventional radio transmitter through the medium of transformer 164, and transmitted to the recording instrument by radio where it is received and recorded on a trace of the seismogram. After condenser 187 in the third branch of the plate circuit of tube 176 has become charged and current ceases to flow in this branch, condenser 184 will be charged. The capacity of this condenser is selected such that the time required for it to become fully charged will be sufficiently long that the uphole geophone 190 will detect and transmit through the preamplifier tube 163 the first impulse received by it. When the charged potential of condenser 184 has become sufficiently high so that when this potential is used as a bias potential for the preamplifier tube 163, the tube will become blocked; then no further modulation can be produced in the modulator circuit of the radio transmitter. This permits the trace on the seismogram on which the time break impulse and the uphole geophone impulse have been recorded to be used to record signals detected by one of the geophones in the conventional spread without interference. The microphone 166 and transformer 167' are connected in such a manner that the shot firer can speak to the operator of the recording instrument.

Another modification of Figure 6 is shown in Figure 10. In using electrical circuits of the type described above, it is often desirable to have an arrangement whereby the true character of the signal detected by the uphole geophone can be recorded or at least as much of the signals from this geophone as are desired. Additionally, it is often desirable to be able to evaluate signals such as "casing breaks" which travel at substantially the same velocity as the waves that travel vertically upward to the uphole geophone. By means of the electrical circuit illustrated in Figure 10, complete control of the period of time during which signals from the uphole geophone are being recorded is possible. In this circuit the time break is transmitted exactly the same as in Figure 6. The signal from the uphole phone 123 is amplified and repeated through the two stage amplifier consisting of transformer 261, repeating tube 262, transformer 263, repeating tube 264, transformer 265 to the telephone lines 72 and 73. The first impulse from the uphole geophone 123 after having been amplified by the tube 262 will be transmitted to the grid of gas triode 266 by means of conductor 267 and condenser 268. This impulse will drive the grid of tube 266 less negative and cause the plate of tube 266 to conduct. This current flows through resistance 269, contact 270 of switch 271, resistance 272, conductor 273, to plus 75 volts D. C. to 0 volts D. C., conductor 274, resistor 275 and back to cathode of gas triode 266. This current produces an IR drop across resistance 275 which charges condenser 276 through resistance 277. The polarity of the voltage of condenser 276 is such that it reduces the negative grid voltage of tube 278 as supplied by the voltage divider. When the potential of condenser 276 reaches a certain value the grid of tube 278 will lose control and the plate circuit of tube 278 conducts current through switch 279, contact 280 of switch 271, resistor 281, meter 282, resistance 283, resistance 284, to ground which is plus 75 volts D. C., to plus 5 volts D. C. and cathode of tube 278. The time required for condenser 276 to become charged to the critical value for tube 278 is determined by the capacitance of condenser 276 and value of resistance 277. Since the time of arrival of the first energy is the desired information, the time constant is set so that tube 278 will trip or start conducting on the order of .01 to .02 second after the first impulse has tripped gas triode 266. When the plate current of tube 278 flows through resistance 283 and 284 and meter 282 an IR drop exists across them. This IR drop is of such value and polarity that it will increase the negative bias on the grid of repeater tube 264 to the point where tube 264 will cease repeating and will, therefore, cut the following signals from the uphole geophone 123 out. Additionally, it will prevent the shot firer from speaking to the recording operator over the microphone circuit composed of microphone 285, battery 286, and resistor 284. This arrangement requires the shot firer to reset the apparatus by closing push button switch 271 down.

When the uphole time is not desired switch 279 is turned to "off" position. This cuts off the plate of tube 278 and shorts out condenser 61. With these changes made, the time break push-push gas triodes 16 and 17 conduct upon the arrival of an impulse from the blaster and this current flows through meter 282, and resistances 284 and 283 which produces an IR drop that disables repeating tube 264. As in the previous instance reset switch 271 must be thrown in the down position to cut the current out of the meter 282 and resistors 284 and 283.

Under some conditions the gas triode tube is subject to firing upon the sudden application of plate voltage, even though the grid bias and plate voltage are the correct values for non-conduction as specified by the manufacturer. The combination of switch 271, resistor 281, and condenser 287 is an arrangement whereby the voltage is gradually applied to the plate of gas triode 278. Switch 271 is spring biased to the position shown in the diagram. The switch is opened by means of a push button and upon releasing the push button the switch returns immediately to the position shown. Assuming that the plate of tube 278 is conducting, switch 271 is then opened. Current continues to the plate by way of condenser 287 until the condenser becomes charged. This charge is approximately equal to the plate voltage available for the plate of tube 278. When switch 271 is released, condenser 287 discharges through resistor 281 and produces an IR drop which is opposite to the plate voltage. At first it is seen that the voltage reaching the plate of 278 is very low. As the condenser 287 becomes discharged and its resulting discharge current IR drop in resistance 281 decreases, the voltage on the plate comes up to normal. The same results are obtained in the plate current of tube 266 by means of condenser 288, contact 270 of switch 271, and resistor 272.

Figure 11 illustrates a typical record showing only two traces. Trace *a* has recorded thereon a time break impulse and the first breaks occasioned by signals which have been generated by a geophone in the conventional spread. Trace *b* shows only a record of the signals which have been generated by an uphole geophone which has been placed adjacent the shot hole. On trace *a* there is shown a succession of secondary breaks which follow the time break impulse. These secondary breaks are due to signals developed in the detonating circuit after the detonation of the explosive charge and are caused by making and breaking the detonating circuit by the ends of the conductors to which the electric blasting cap was connected coming in contact with each other or the casing of the shot hole. Additionally, it will be noted that there is recorded on trace a at c, a high frequency wave of low amplitude. The signals which produced this wave also originate in the blasting circuit and are caused by commutator ripple in the blaster itself. In order to record the time break, the uphole geophone impulse and the first break from a geophone in the conventional spread on the same trace, it is necessary that the spurious voltages corresponding to the secondary breaks and the commutator ripple be eliminated from the record. By comparing traces a and b it will be seen that if an attempt is made to record the uphole geophone break on a record which has secondary breaks and commutator ripple recorded thereon, the uphole break would be indistinguishable.

By using the invention forming the subject matter of this application, a record such as that illustrated in Figure 12 can be recorded. On trace d, there is shown a definite time break and a definite first break occasioned by signals detected by a geophone in the conventional spread. The spurious voltages which cause secondary breaks and commutator ripple have been entirely eliminated from the trace. By comparing trace d with trace e it is obvious that the record of the uphole geophone impulse could be recorded on the same trace with the time break and the first break occasioned by a geophone in the conventional spread.

In Figure 13 there is illustrated a trace of a seismogram on which the time break impulse, the uphole geophone break and the first break from a geophone in the spread are all distinctly recorded on the same trace. It will be noted that each signal is definite and can be accurately read by the interpreter.

The trace shown in Figure 14 differs from that shown in Figure 13 in that signals corresponding to reflected waves are also recorded on the same trace with the other three data. This trace represents an ideal record for it has all of the data recorded on it that is needed from a particular spread when shot in one direction. It will be noted that after the first break has been recorded from the geophone in a spread, that the gain in amplification is suppressed to some predetermined minimum value and automatically expanded with time in such a manner that all of the signals corresponding to reflected waves are recorded with substantially the same amplitude.

Although this invention has been described in detail in connection with the use of hot-cathode control-grid type tubes commonly known on the market as type 884 and 885, it is obvious to those skilled in the art that these triodes can be replaced by cold-cathode starter-anode type gas triodes. These are generally known on the market as 0A4—G gas triodes. A shield is indicated in the gas tubes of Figure 6 and Figure 10. These are referred to as gas triodes. They are in fact gas tetrodes, due to the additional element. These are of the RCA 2051 type. The general characteristics of the gas triode and gas tetrode are the same.

We claim:

1. A method of recording a plurality of seismic data on a single trace of a seismogram that comprises the steps of detonating an explosive charge in the earth's surface to create seismic waves, generating and recording on a trace of a seismogram a signal indicative of the instant of detonation, blocking additional signals that are generated in the detonating circuit from the recording instrument so that they will not be recorded as secondary breaks, detecting the first impulse of waves which have traveled vertically upward from the explosive charge, recording the first impulse on the same trace with the signal that is indicative of the instant of detonation, blocking signals, which are generated by the geophone subsequent to the first impulse, from the recorder, detecting waves which have traveled directly from the explosive charge to a geophone in a conventional spread, recording these detected waves and subsequent reflections on the same trace with the first two mentioned signals.

2. The method of producing a plurality of seismic data for recordation on a single trace of a seismogram which comprises, creating seismic waves at a subsurface shotpoint, generating an electrical impulse at the instant of creation of said seismic waves, recording said impulse on a trace of a seismogram, coincidentally with the generation of said impulse blocking from said seismogram additional electrical impulses produced as a result of initiation of said seismic waves, producing an electrical impulse coincidentally with arrival at the earth's surface of vertically travelling seismic waves, recording said last-mentioned electrical impulse on said same trace of said seismogram, at a receiving location a substantial distance from said subsurface shotpoint location generating electrical signals representative of seismic waves which have traveled thereto, prior to arrival of seismic waves at said receiving location blocking from said seismogram further impulses produced by said vertically travelling waves, and recording on said same trace of said seismogram the electrical signals generated at said receiving location.

3. In a system in which seismic data is to be transmitted over a single transmission channel from a shotpoint to a recording location, the method of eliminating overlapping of the data on a trace of a seismogram which comprises, creating seismic waves at a shotpoint, generating an electrical impulse at the instant of creation of said waves, transmitting said impulse to the recording location for recordation on a trace of said seismogram as the time break, blocking from said seismogram all subsequent electrical impulses produced as a result of initiation of said waves, producing an electrical signal upon first arrival at the earth's surface of vertically travelling seismic waves, transmitting said signal over said channel to the recording location for recordation on the same trace of said seismogram as the uphole break, after transmission of said signal and prior to arrival of seismic waves at a receiving location a substantial distance along the earth's surface from said shotpoint and relatively near said recording location blocking said channel to prevent further transmission of signals or impulses from said shotpoint to said recording location, as the seismic waves arrive at said last named receiving location generating electrical signals representative thereof, and recording on said same trace of said seismogram said last named signals which are representaive of direct travelling and of reflected seismic waves.

EARLEY M. SHOOK.
ROBERT W. OLSON.